United States Patent [19]

Daman

[11] Patent Number: 5,375,408
[45] Date of Patent: Dec. 27, 1994

[54] COMBINED-CYCLE POWER GENERATION SYSTEM USING A COAL-FIRED GASIFIER

[75] Inventor: Ernest L. Daman, Westfield, N.J.

[73] Assignee: Foster Wheeler Development Corporation, Livingston, N.J.

[21] Appl. No.: 89,983

[22] Filed: Jul. 6, 1993

[51] Int. Cl.⁵ .............................................. F02C 3/28
[52] U.S. Cl. ................................ 60/39.02; 60/39.12; 60/39.182; 60/39.464
[58] Field of Search ............... 60/39.12, 39.82, 39.464, 60/39.02, 39.05, 39.06

[56] References Cited

U.S. PATENT DOCUMENTS

| | | | |
|---|---|---|---|
| 3,002,347 | 10/1961 | Sprague | 60/39.12 |
| 3,868,817 | 3/1975 | Marion et al. | 60/39.02 |
| 3,968,348 | 10/1976 | Switzer, Jr. | 60/39.182 |
| 3,991,557 | 11/1976 | Donath | 60/39.12 |
| 4,184,322 | 1/1980 | Paull et al. | 60/39.02 |
| 4,212,160 | 7/1980 | Blaskowski | 60/39.182 |
| 4,250,704 | 2/1981 | Bruckner et al. | 60/39.12 |
| 4,261,166 | 4/1981 | Mayrhofer | 60/39.182 |
| 4,697,413 | 10/1987 | Pohl | 60/39.02 |
| 4,996,836 | 3/1991 | Reh et al. | 60/39.12 |
| 5,117,623 | 6/1992 | Arundale | 60/39.05 |

Primary Examiner—Timothy S. Thorpe
Attorney, Agent, or Firm—Marvin A. Naigur

[57] ABSTRACT

An integrated gasification combined cycle power generation system in which a carbonaceous material, such as coal, is gasified combusted in a gasifier to provide synthesis gas which mixes with ash produced as a result of the gasification. The mixture is cooled below the softening temperature of the ash before the gas is separated from the ash and is used to drive a gas turbine. Heat from the combustion process is removed from the gas and the ash and is used to produce steam.

39 Claims, 1 Drawing Sheet

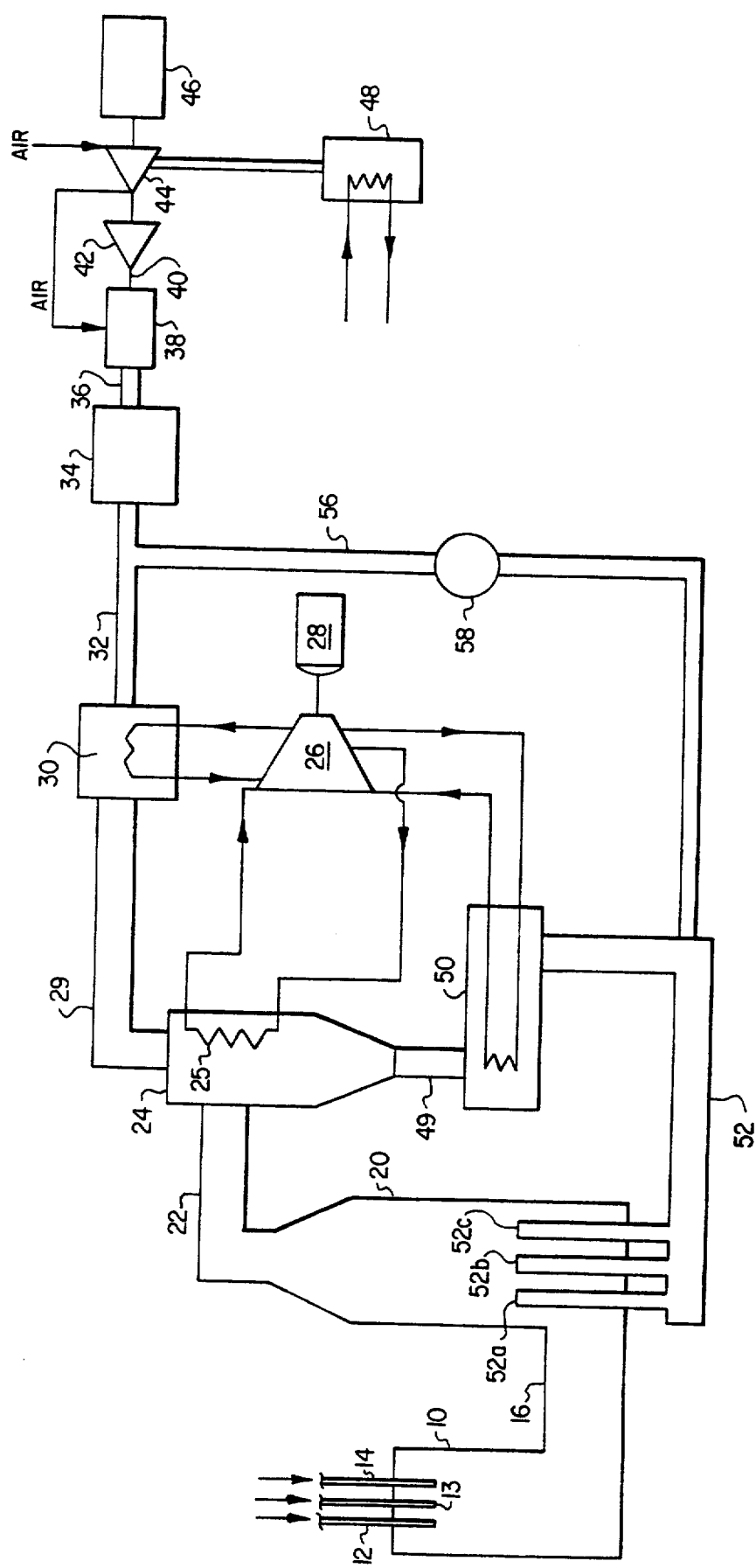

COMBINED-CYCLE POWER GENERATION SYSTEM USING A COAL-FIRED GASIFIER

BACKGROUND OF THE INVENTION

This invention relates to an combined cycle power generation system and method utilizing a coal fired gasifier and, more particularly, to such a system and method in which synthesis gas is produced and is used to provide heat for a steam cycle and to drive a gas turbine.

In order to reduce sulfur dioxide emission levels in fossil fuel power stations, a generation of stack gas clean up equipment has evolved which removes, or scrubs, sulfur dioxide from the steam generator flue gases prior to their release into the atmosphere. However, this is expensive largely due to the equipment required and the high volume of gases that must be processed.

As a result, a gasification process has evolved in which a carbonaceous material, such as particulate coal, is gasified in, for instance, an entrained flow gasifier. A combustible synthesis gas ("syngas") is produced by the gasification of the carbonaceous material. Desulfurization is accomplished after the syngas is cooled sufficiently using well known syngas scrubbers. The gas is then passed to a gas turbine combustor and then to the gas turbine expander which drives an electric generator.

In the production of electric power, improved efficiencies can be achieved by utilizing a combined gas turbine and steam turbine cycle. In these arrangements the syngas is used to drive a gas turbine as described above while a steam turbine cycle is carried out with steam which is produced from cooling the syngas and the combustion gas leaving the gas turbine.

However, in these arrangements the gasification of the carbonaceous material produces a bulk ash which, due to the fact that it is in an environment in which the temperature is above it's softening temperature, becomes sticky and molten causing fouling on reactor and heat exchanger surfaces. The soft ash particles are also extremely difficult to handle and transport which is a major problem since heat must subsequently be removed from the particles and from a mixture of syngas and the particles.

SUMMARY OF THE INVENTION

It is therefore an object of the present invention to provide a system and method utilizing a coal fired gasifier in a power generation system.

It is a further object of the present invention to provide a system and method of the above type in which syngas is produced which is utilized to drive a gas turbine.

It is a still further object of the present invention to provide a system and method of the above type in which the bulk ash produced as a result of the gasification of the carbonaceous material is pretreated to reduce it's temperature below it's softening temperature to reduce fouling and deposition and the problems associated therewith.

It is a still further object of the present invention to provide a system and method of the above type in which cold solids from the combined cycle are utilized to reduce the temperature of the bulk ash to render it non-sticking.

Towards the fulfillment of the these and other objects, according to the system and method of the present invention a carbonaceous material, such as particulate coal, is gasified to provide synthesis gas which is mixed with ash produced as a result of the gasification. The mixture is cooled below the softening material of the ash before the gas is separated from the ash and is used to drive a gas turbine. Heat is removed from the gas and ash and is used to produce steam.

BRIEF DESCRIPTION OF THE DRAWINGS

The above description, as well as further objects, features and advantages of the present invention will be more fully appreciated by reference to the following detailed description of the presently preferred but nonetheless illustrative embodiments in accordance with the present invention when taken in conjunction with the accompanying drawing which is a schematic representation of the system of the present invention.

DESCRIPTION OF THE PREFERRED EMBODIMENT

Referring to the drawing, the reference numeral 10 refers, in general, to an entrained flow gasifier which receives oxygen, coal and steam from conduits 12, 13, and 14, respectively. The gasifier is of a conventional design and therefore will not be described in detail. The lower, or outlet, end of the gasifier 10 is connected, via a duct 16, to an entrainment vessel 20 having an inlet opening in the lower portion of one wall thereof which communicates with the duct. The coal is gasified in the presence of the oxygen and steam in the gasifier 10 in a conventional manner to produce a syngas which is mixed with solid ash particles in the vessel. Thus, a mixture of the syngas and the entrained particles from the gasifier 10 are introduced into the vessel 20 for reasons to be described.

An outlet is formed at the upper portion of the vessel 20 which communicates, via a conduit 22, to a cyclone separator 24 which receives the mixture of gases and particles and operates to separate the gases from the particles in a conventional manner. A bundle of exchange tubes 25 is provided in the separator 24 and is connected in a flow circuit including a steam turbine 26 for circulating water or steam through the bundle to transfer heat from the gases and particles in the separator to the water or steam for passage to the turbine. The turbine 26 is drivingly connected to an electrical generator 28 to generate electrical power. Since the cyclone separator 24, the tube bundle 25, the turbine 26, and the generator 28 are conventional, they will not be described in any further detail.

A gas outlet is provided in the upper portion of the separator 24 and is connected, via a duct 29, to a heat exchanger 30 which operates in a conventional manner to transfer heat from the gases received from the duct to water or steam flow circuitry forming a part of the steam generation cycle discussed above and thus connected to the steam turbine 26. The outlet of the heat exchanger 30 is connected, via a duct 32, to a conventional scrubber 34 to remove sulfur and other impurities from the gases. A duct 36 connects the scrubber to a combustor 38 which, in turn, is connected, via a duct 40, to a gas turbine 42 which drives a compressor 44 which is in driving engagement with an electrical generator 46. In the combustor 38 the gases are mixed with air from the compressor 44 for combustion and then expanded thru the gas turbine 42 to drive the electrical generator 46 to generate electrical power. A heat exchanger 48 is connected to the outlet of the compressor and utilizes heat from the gas turbine exhaust to heat steam which is circulated through the above-mentioned flow circuit including the steam turbine 28.

The separator 24 includes an outlet for the separated particles which is connected, via a duct 49, to a fluidized bed heat exchanger 50 which also operates in a conventional manner to transfer heat from the separated particles to water or steam flow circuitry contained therein and forming a part of the aforementioned steam generation cycle including the steam turbine 26. It is understood that the tube bundle 25 and the flow circuitry in the heat exchangers 30 and 50 are shown directly connected to the steam turbine 26 for the convenience of presentation and that this circuitry includes other components and may involve other connections, all of which are conventional.

A duct 52 connects the cooled particle outlet of the heat exchanger 50 to the lower end of the entrainment vessel 20. The duct 52 branches into three or more slightly-spaced vertical distributors 52a, 52b, and 52c which extend through the bottom wall of the vessel 20 and into the interior of the vessel for introducing the relatively cool solids into the interior of the vessel 20 for reasons to be described.

A duct 56 connects the duct 32 to the duct 52 and a blower 58 is provided in the duct 56 for utilizing a portion of the gases from the duct 32 to transport the relatively cool particles from the heat exchanger 50 into the vessel 20 and to fluidize the solids in the heat exchanger 50.

In operation, a carbonaceous fuel, such as crushed coal, is introduced into the gasifier 10 through the conduit 13 along with a sufficient quantity of oxygen and steam through the conduit 12 and 14 respectively to achieve gasification of the coal to generate a syngas, in a conventional manner. The syngas contains some solid particles and bulk ash produced from the coal. This mixture, at a temperature of approximately 2500° F., which is above the softening temperature of the ash, then passes, via the duct 16, into the entrainment vessel 20 where it is cooled in a manner to be described, before it is passed, via the duct 22, to the separator 24.

The cooled mixture of syngas and solid particles is further cooled in the separator 24 by the heat exchange with relatively cool water or steam passing through the tube bundle 25 before the heated water or steam is passed to the steam turbine 26 for driving the generator 28. The separator 24 operates to separate the syngas from the particles, and the former is passed, via the duct 29, to the heat exchanger 30, and the latter is passed, via the duct 49, to the heat exchanger 50. Heat is transferred from the syngas in the heat exchanger 30 to water or steam passing through the flow circuitry associated with the heat exchanger 30 to still further cool the syngas before the heated water or steam is passed to the steam turbine 26. The cooled syngas from the heat exchanger 30 is then passed, via the duct 32, to the scrubber 34 and, then to combustor 38 where the gas is combusted and expanded through the gas turbine 42 to drive the electrical generator 46. The exhaust of the gas turbine 42 is passed to the heat exchanger 48 for heating steam which is circulated through the flow circuit including the steam turbine 26.

The separated particles in the heat exchanger 50 are fluidized and their heat is transferred to water or steam passing through the flow circuitry connecting the heat exchanger 50 with the steam turbine 26 to still further cool the particles to a temperature of approximately 1000° F. The cooled particles are then passed, via the duct 52 and the branch ducts 52a, 52b, and 52c, to the interior of the entrainment vessel 20 where they mix with, and absorb heat from, the mixture of syngas and relatively hot particles passing therethrough as described above. This heat exchange is sufficient to lower the temperature of the particles in the syngas-solids mixture, to a temperature of approximately 1600° F. which is lower than the softening temperature of the particles. In the above process of mixing, some agglomeration of ash will occur and the agglomerated ash will be withdrawn thru duct 60, quenched in the cooler 62 and passed to external equipment for disposal. The remaining finer ash at 1600° is thus rendered non-sticking and will not deposit on any downstream heat transfer surfaces.

A portion of the syngas is tapped from the duct 32 and passed, via the duct 56, to the duct 52 to pneumatically assist the movement of the particles from the heat exchanger 50 to the vessel 20 and to fluidize the particles in the heat exchanger 50. Since this syngas is at a relatively low temperature by virtue of having passed through the heat exchanger 30, it does not increase the temperature of the particles.

Therefore, the system and method of the present invention utilizes a combined gas turbine and steam turbine cycle while providing an efficient and clean technique for reducing the temperature of the ash particles to a value below their softening temperature before they are passed through the system.

It is understood that variations may be made in the foregoing without departing from the scope of the invention. For example, an air preheat system can be used in place of the steam cycle in the heat exchangers 30 and/or 50 to receive the heat from the gas and the particles, respectively.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method of generating and utilizing heat for the production of power, comprising the steps of gasifying coal in the presence of oxygen and steam to produce a mixture of gas and solid particles of ash, cooling said mixture, then separating said gas from said particles, and then further cooling said separated particles, said step of cooling said mixture comprising the step of passing said further cooled particles in a heat exchange relation with said mixture.

2. The method of claim 1 further comprising the steps of transferring heat from said gas to water or steam to further cool said gas, and passing said steam to a steam turbine for driving same.

3. The method of claim 1 or 2 further comprising the step of passing said separated gas to a gas turbine to drive same.

4. The method of claim 3 wherein said separated gas is passed to said gas turbine after said step of transferring heat.

5. The method of claim 2 wherein said step of further cooling said separated particles comprises the step of passing steam or water in a heat exchange relation with said separated particles to heat said water or steam.

6. The method of of claim 5 further comprising the step of passing said heated steam to said steam turbine to drive same.

7. The method of claim 1 wherein said step of removing heat from said separated particles comprises the step of passing steam or water in a heat exchange relation with said separated particles to heat said water or steam.

8. The method of claim 7 further comprising the step of passing said heated steam to a steam turbine to drive same.

9. The method of claim 1 wherein, in said step of cooling, said particles are cooled below their softening temperature to prevent sticking thereof.

10. The method of claim 1 further comprising the step of further cooling said gas and said particles during said step of separating.

11. The method of claim 10 wherein said step of further cooling said gas and said particles comprises the step of passing steam or water in a heat exchange relation with said gas and said particles to heat said water or steam.

12. The method of claim 11 further comprising the step of passing said heated steam to a steam turbine to drive same.

13. The method of claim 1 further comprising the steps of passing a portion of said separated gas to said further cooled particles to pneumatically assist the passage of said further cooled particles to said mixture.

14. A method of generating and utilizing heat, comprising the steps of gasifying coal particles in the presence of oxygen and steam to produce a mixture of gas and solid particles including ash, cooling said mixture, them separating said gas from said particles while simultaneously further cooling said gas and said particles, passing said separated gas to a heat exchanger for still further cooling said gas, then passing said cooled, separated gas to a gas turbine for driving same, and passing said separated particles to a heat exchanger for still further cooling said particles.

15. The method of claim 14 wherein said step of cooling said mixture comprises the step of passing said further cooled particles in a heat exchange relation with said mixture.

16. The method of claim 14 wherein said step of further cooling said gas and said particles comprises the step of passing water or steam in a heat exchange relation with said gas and said particles to heat said water or steam.

17. The method of claim 16 further comprising the step of passing said heated steam to a steam turbine to drive same.

18. The method of claim 14 wherein said steps of further cooling said separated gas and further cooling said separated particles comprise the step of passing water or steam in a heat exchange relation with said separated gas and said separated particles, respectively, to heat said water or steam.

19. The method of claim 18 further comprising the step of passing said heated steam to a steam turbine to drive same.

20. The method of claim 14 further comprising the steps of passing a portion of said still further cooled gas to said further cooled particles to pneumatically assist the passage of said further cooled particles to said mixture.

21. A system for generating and utilizing heat for the production of power, comprising means for gasifying coal in the presence of oxygen and steam to produce a mixture of gas and solid particles including ash, means for cooling said mixture, means for treating said cooled mixture to separate said gas from said particles, means for removing heat from said separated particles to further cool said particles, and means for passing said further cooled particles to said cooling means, said cooling means comprising means for passing said further cooled particles in a heat exchange relation with said mixture.

22. The system of claim 21 further comprising means for transferring heat from said gas to water or steam to further cool said gas, and means for passing said steam to a steam turbine to drive same.

23. The system of claim 21 or 22 further comprising the step of passing said separated gas to a gas turbine to drive same.

24. The system of claim 22 wherein said means for removing heat from said separated particles comprises means for passing steam or water in a heat exchange relation with said separated particles to heat said water or steam.

25. The system of claim 24 further comprising means for passing said heated steam to said steam turbine to drive same.

26. The system of claim 21 wherein said means for removing heat from said separated particles comprises means for passing steam or water in a heat exchange relation with said separated particles to heat said water or steam.

27. The system of claim 26 further comprising means for passing said heated steam to a steam turbine to drive same.

28. The system of claim 21 wherein said treating means comprises means for further cooling said gas and said particles during said separation thereof.

29. The system of claim 28 wherein said latter means for further cooling said gas and said particles comprises means for passing steam or water in a heat exchange relation with said gas and said particles to heat said water or steam.

30. The system of claim 29 further comprising means for passing said heated steam to a steam turbine to drive same.

31. The system of claim 21 wherein said means for passing said further cooled particles in a heat exchange relation with said mixture comprises means for passing a portion of said separated gas to said further cooled particles to pneumatically assist the passage of said further cooled particles to said mixture.

32. A system for generating and utilizing heat, comprising means for gasifying coal in the presence of oxygen and steam to produce a mixture of gas and solid particles, means for cooling said mixture, a separator, means for passing said cooled mixture to said separator for separating said gas from said particles, means for further cooling said gas and said particles in said separator, means for passing said further cooled, separated gas to a gas turbine for driving same, and means for passing said separated particles from said separator and still further cooling said separated particles, said means for cooling said mixture comprises means for passing said still further cooled particles in a heat exchange relation with said mixture.

33. The system of claim 32 further comprising means for passing said separated gas from said separator and still further cooling said separated gas.

34. The system of claim 33 wherein said means for further cooling said gas and said particles comprises means for passing water or steam in a heat exchange relation with said gas and said particles in said separator to heat said water or steam.

35. The system of claim 34 further comprising means for passing said heated steam to a steam turbine to drive same.

36. The system of claim 33 wherein said means for still further cooling said separated gas comprise the step of passing water or steam in a heat exchange relation with said separated gas to heat said water or steam.

37. The system of claim 32 wherein said means for still further cooling said separated particles comprise the step of passing water or steam in a heat exchange relation with said separated particles to heat said water or steam.

38. The system of claim 36 or 37 further comprising means for passing said heated steam to a steam turbine to drive same.

39. The system of claim 32 wherein said means for passing said further cooled particles in a heat exchange relation with said mixture comprises means for passing a portion of said still further cooled gas to said cooled particles to pneumatically assist the passage of said further cooled particles to said mixture.

* * * * *

UNITED STATES PATENT AND TRADEMARK OFFICE
CERTIFICATE OF CORRECTION

PATENT NO. : 5,375,408
DATED : December 27, 1994
INVENTOR(S) : Ernest L. Daman

It is certified that error appears in the above-indentified patent and that said Letters Patent is hereby corrected as shown below:

Column 4, line 15, "1600" should be --1600°F--.

Column 5, line 33, "them" should be --then--.

Signed and Sealed this

Sixteenth Day of May, 1995

Attest:

BRUCE LEHMAN

Attesting Officer     Commissioner of Patents and Trademarks